(No Model.)
I. S. MOWRER.
STEAM COOKER.
No. 485,819. Patented Nov. 8, 1892.
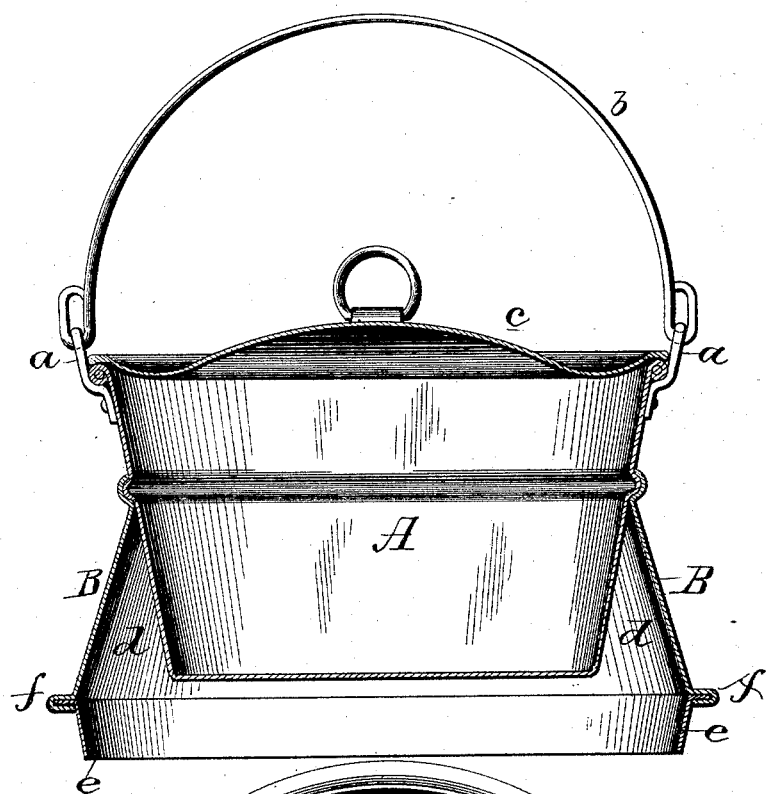
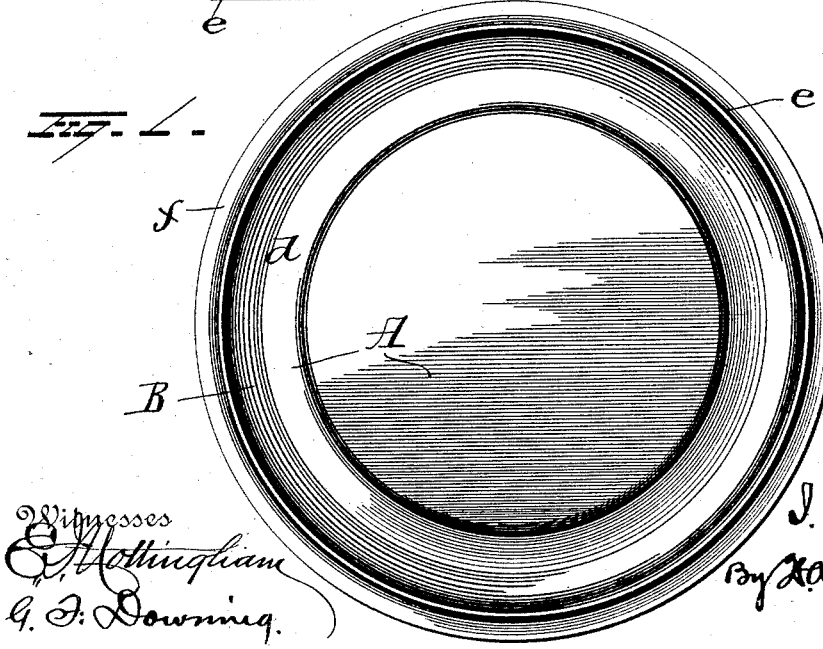
Witnesses
E. Nottingham
G. F. Downing
Inventor
I. S. Mowrer
By H. A. Seymour
Attorney

UNITED STATES PATENT OFFICE.

ISAAC S. MOWRER, OF XENIA, OHIO.

STEAM-COOKER.

SPECIFICATION forming part of Letters Patent No. 485,819, dated November 8, 1892.

Application filed May 7, 1891. Serial No. 391,923. (No model.)

*To all whom it may concern:*

Be it known that I, ISAAC S. MOWRER, of Xenia, in the county of Greene and State of Ohio, have invented certain new and useful Improvements in Steam-Cookers; and I do hereby declare the following to be a full, clear, and exact description of the invention, such as will enable others skilled in the art to which it appertains to make and use the same.

My invention relates to an improvement in cooking utensils, and more particularly to devices for cooking from the heat of steam.

The object of my invention is to produce a cooking utensil by means of which hominy, rice, and similar food (likely to be burned when the vessel containing them is subject to the direct heat of the fire) may be cooked by the heat of steam, the device being constructed in such manner that the steam will not have direct contact with the food being cooked.

A further object is to produce an improved cooker suitable for cooking food easily burned, said cooker being constructed in such manner that it may be fitted upon a pot or other cooking utensil containing water, whereby the steam will be permitted to make contact with said cooker and cook the food therein without making direct contact with said food.

With these objects in view the invention consists in the combination, with a vessel closed at the bottom and sides, of a jacket secured to and projecting from said vessel, said jacket being made with an open bottom whereby steam will be permitted to enter said jacket and make contact with the exterior of the vessel; and the invention also consists in certain novel features of construction and combinations and arrangements of parts, as hereinafter set forth, and pointed out in the claim.

In the accompanying drawings, Figure 1 is a bottom plan view of my improved cooker. Fig. 2 is a sectional view of the same.

A represents a vessel, preferably made of tin and to some extent of conical form. This vessel will preferably be provided with ears $a$ for the attachment thereto of a handle $b$, and said vessel will also be provided with a removable cover $c$. Secured to the vessel A at a point between its ends, preferably over a rib formed thereon, is a sheet-iron jacket B, said jacket being adapted to project outwardly from its connection with the vessel A to produce a space $d$ between it and the said vessel and is provided at its lower end with an inwardly and downwardly projecting flange $e$. At the junction of the jacket B and flange $e$ a small lateral flange $f$ is formed. The device being constructed in the manner above set forth, is adapted to be placed on the top of an ordinary dinner-pot, the flange $e$ being adapted to enter said pot and the flange $f$ being adapted to rest on the top edge of the pot. The food to be cooked may now be placed in the vessel B and steam from water in the pot permitted to strike the bottom of said vessel and also enter the space $d$ and make contact with the sides of the vessel. Thus it will be seen that the food in the receptacle A will be cooked by the heat of the steam making contact with said receptacle and that the steam is not permitted to pass through the food.

Various kinds of food which are likely to burn by exposing the vessel to the direct action of the fire may be cooked in my improved cooker without liability of being burned.

Having fully described my invention, what I claim as new, and desire to secure by Letters Patent, is—

As an article of manufacture, a culinary article comprising a tapering vessel provided with a circumferential rib and a jacket formed of two oppositely-tapering rings, one of which is provided with an outwardly-projecting flange and the other with an overlapping flange which incloses the outwardly-projecting flange to form a joint between the parts, substantially as set forth.

In testimony whereof I have signed this specification in the presence of two subscribing witnesses.

ISSAC S. MOWRER.

Witnesses:
DANIEL RAINIER EBRIGHT,
LINDSEY MARSHALL.